United States Patent [19]

Brand et al.

[11] 4,240,468
[45] Dec. 23, 1980

[54] SOLENOID OPERATED VALVE

[75] Inventors: Peter Brand; Adolf Helms, both of Hamburg, Fed. Rep. of Germany

[73] Assignee: Hauni-Werke Körber & Co. KG, Hamburg, Fed. Rep. of Germany

[21] Appl. No.: 887,311

[22] Filed: Mar. 16, 1978

[30] Foreign Application Priority Data

Mar. 30, 1977 [DE] Fed. Rep. of Germany ....... 2714091
Dec. 23, 1977 [DE] Fed. Rep. of Germany ....... 2757659

[51] Int. Cl.³ .............................................. F16K 31/06
[52] U.S. Cl. ................................ 137/625.33; 137/332; 251/139; 251/141; 335/255
[58] Field of Search ................... 137/331, 332, 625.33, 137/625.28; 251/139, 141

[56] References Cited

U.S. PATENT DOCUMENTS

| 1,976,151 | 10/1934 | Thaheld | 137/332 X |
| 2,261,562 | 11/1941 | Ray | 251/141 X |
| 2,616,452 | 11/1952 | Clay et al. | 251/139 |
| 2,881,980 | 4/1959 | Beck et al. | 239/585 X |
| 3,219,063 | 11/1965 | Schumann et al. | 137/625.33 |

Primary Examiner—Martin P. Schwadron
Assistant Examiner—Richard Gerard
Attorney, Agent, or Firm—Peter K. Kontler

[57] ABSTRACT

A solenoid operated shutoff valve for compressed air has a tubular ferromagnetic core which is surrounded by an excitable coil and confines a reciprocable ferromagnetic plunger movable into and from sealing engagement with a fixedly mounted valve seat. The seat is installed in one of two coaxial tubular sections of the core and the other section has an axial opening for admission of compressed air to one end face of the plunger so that the other end face of the plunger normally bears against and seals the fluid evacuating opening in the seat. The periphery of the plunger is formed with straight and/or helical grooves defining discrete paths for the flow of compressed gas from the other section of the core into the opening of the seat when the coil is energized to propel the plunger away from the seat. The plunger may be formed with an axial bore which establishes a further path for the flow of compressed air into the opening of the seat. The opening of the seat may consist of an annulus of discrete ports or of a circumferentially complete channel in that end face of the seat which is adjacent to the respective end face of the plunger. The surfaces of the plunger are coated with nickel to reduce friction between such surfaces and the internal surface of the respective section of the core. If at least one of the peripheral grooves of the plunger is a helix, the plunger rotates in response to opening of the valve to thus prevent the accumulation of contaminants in the grooves and/or along the internal surface of the respective core section.

11 Claims, 5 Drawing Figures

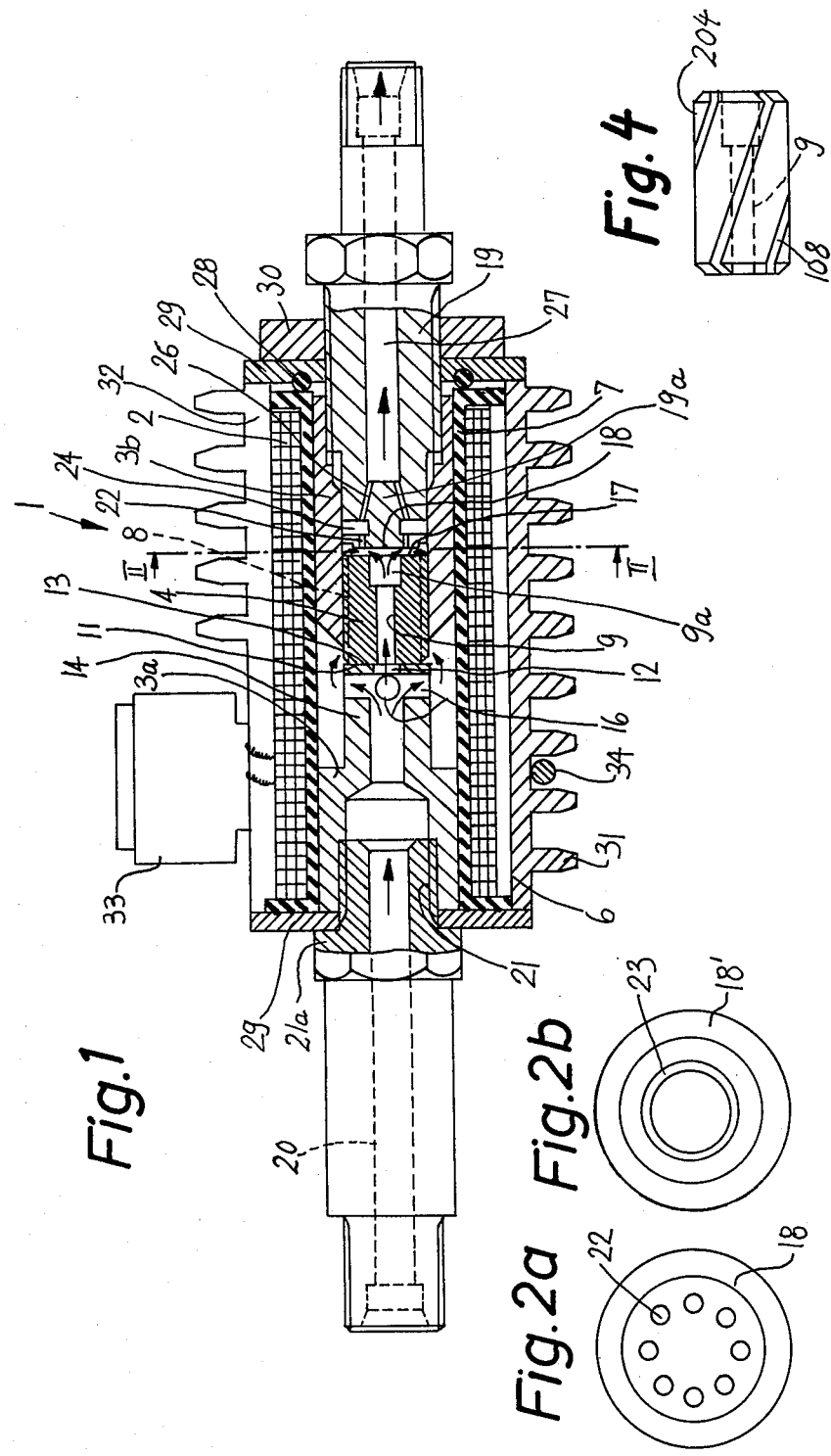

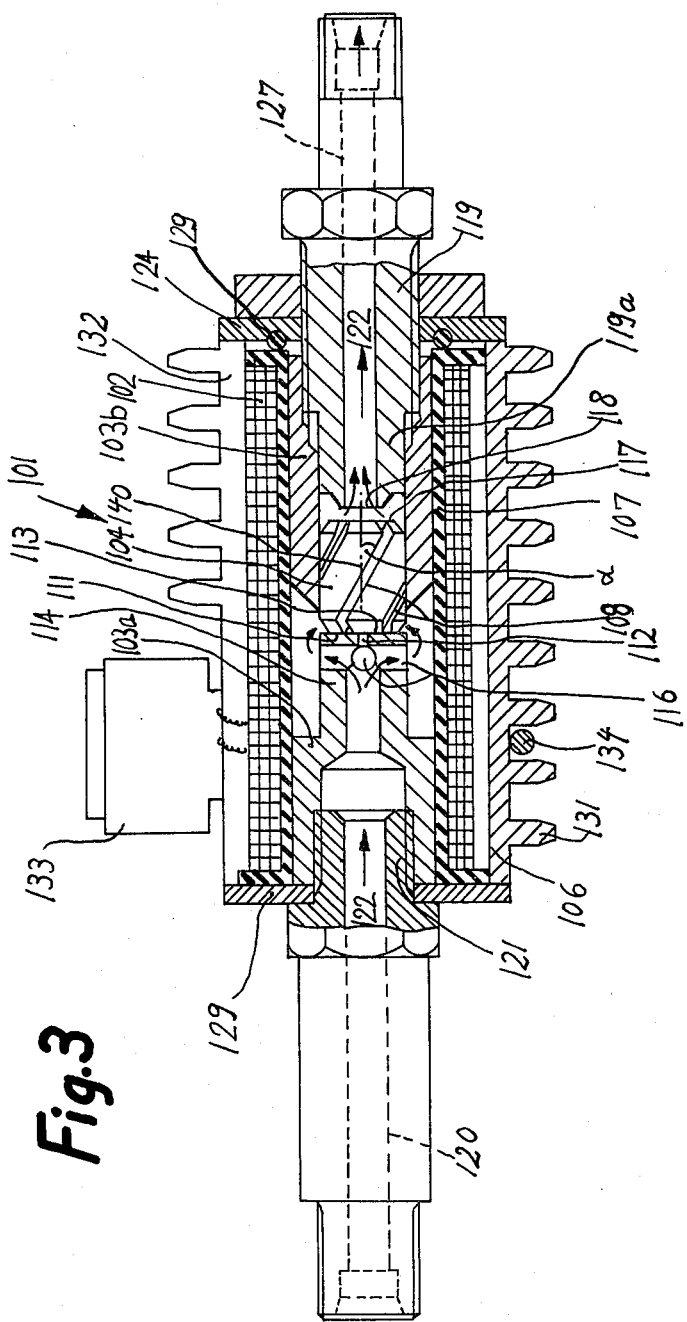

SOLENOID OPERATED VALVE

BACKGROUND OF THE INVENTION

The present invention relates to valves in general, especially to shutoff valves for pressurized fluids, and more particularly to improvements in valves with plunger type solenoids. Still more particularly, the invention relates to improvements in valves wherein the plunger of the solenoid directly cooperates with a fixed valve seat.

It is often necessary to establish or interrupt the flow of a pressurized fluid (particularly a compressed gas) at frequent intervals. Solenoid operated valves are highly suitable for such purposes and have found widespread use in many fields where the flow of pressurized gas must be controlled at intervals as frequent as several thousand times per minutes. Typical examples of applications of such valves are in testing of cigarettes or analogous rod-shaped products which are produced in quantities of up to and in excess of 70 per second and are monitored, one after the other, for the quality of their wrappers, density of their tobacco-containing ends, presence or absence of printed matter and/or other characteristics. Defective articles must be segregated from satisfactory articles with a high degree of reliability in order to prevent defective articles from reaching the consumer. This entails rapid opening of a valve which discharges compressed gas (normally air) when a defective or potentially defective article reaches the segregating station, and the valve must close practically instantaneously to avoid ejection of one or more satisfactory articles which follow a defective article. By the same token, the valve should not open prematurely in order to avoid segregation of one or more satisfactory articles preceding a defective article which is on its way to the ejecting station. The situation is analogous in many other fields, for example, in connection with electronic monitoring of the quality, size and/or other characteristics of coffee beans or other discrete commodities.

Attempts to enable presently known solenoid operated valves to satisfy the requirements in the just-enumerated and other fields have met with limited success. For example, it was already proposed to employ springs and/or other biasing means to accelerate the movements of the armature of a solenoid operated valve to the one (closing) or the other (open) position. Resilient means can promote rapid movement of the armature to one end position (e.g., to closed position); however, they oppose the movement of the armature to the other end position so that they actually delay the opening of the valve. Other known proposals, mainly attempts to achieve a compromise between predictable closing and opening of the valve, failed to gain acceptance in many industries because the frequency at which such valves open or close is too low.

OBJECTS AND SUMMARY OF THE INVENTION

An object of the invention is to provide a valve, especially a shutoff valve for pressurized fluids, which can be opened and closed at a requisite frequency and which can be used as a superior substitute for presently known valves.

Another object of the invention is to provide a solenoid operated valve which can meet the requirements of modern testing equipment for mass-produced articles and is also capable of opening and closing at a frequency which is necessary to warrant its use in anticipated further developments of presently known testing and like equipment.

A further object of the invention is to provide a novel and improved valving element for use in a valve of the above outlined character and to provide the valve with a novel and improved valve seat which can cooperate with the valving element.

An additional object of the invention is to provide a novel and improved solenoid for use in the above outlined valve.

A further object of the invention is to provide a valve which can open or close within a minute fraction of one second so that it can be opened and closed in synchronism with movements of articles which are mass-produced or mass-processed at a rate of at least 4,000 per minute.

An additional object of the invention is to provide the valve with novel and improved means for preventing the accumulation of sediments in the fluid-conveying path or paths.

An ancillary object of the invention is to provide the valve with novel and improved means for limiting the extent of movement of its valving element between open and closed positions.

The invention is embodied in an electromagnetic shutoff valve for fluids, particularly for compressed gaseous fluids, which comprises a tubular coil, a tubular ferromagnetic core which is surrounded by the coil and may consist of two coaxial sections, a valve seat within the core (the valve seat may form part of a nipple which defines an outlet opening for the fluid), a ferromagnetic valving element which is preferably a cylindrical plunger and is reciprocably mounted in the core so that one of its end faces can move into and out of sealing engagement with the seat and its other end face is subjected to the pressure of fluid which is admitted through the inlet opening of a second nipple secured to the core whereby the fluid tends to maintain the one end face of the plunger in sealing engagement with the seat, and a plurality of passages provided in the plunger and establishing discrete paths for the flow of fluid from the other to the one end face. The coil is energizable to move the plunger away from the seat and to thus enable the fluid to flow from the passages of the plunger into one or more openings of the seat on its way into the outlet opening.

The plunger may be provided with an axial bore which establishes one of the paths and with one or more peripheral grooves (such groove or grooves may be parallel to the axis of the plunger or they may form helices making an acute angle with the axis of the plunger) which establish one or more additional paths for the flow of fluid.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a solenoid operated valve which embodies one form of the invention;

FIG. 2a is an end elevational view of the valve seat as seen in the direction of arrows from the line II—II of FIG. 1;

FIG. 2b is an end elevational view of a modified valve seat;

FIG. 3 is an axial sectional view of a modified solenoid operated valve; and

FIG. 4 is an elevational view of a modified plunger which can be used in the valve of FIG. 1.

DESCRIPTION OF THE PREFERRED EMBOIDMENTS

FIG. 1 shows a solenoid operated shutoff valve 1 whose valving element 4 constitutes the reciprocable plunger of an iron clad solenoid. The solenoid further comprises an elongated cylindrical coil 2 and a composite sleeve-like ferromagnetic core including two coaxial tubular sections 3a and 3b which are magnetically separated from each other. A portion of the section 3b surrounds and constitutes a guide for the plunger 4. The coil 2 is surrounded by a tubular cooling jacket 6 consisting of thermally and electrically conductive material. An elongated spool 7 of electrically insulating material is interposed between the sections 3a, 3b and the coil 2.

The plunger 4 is a hollow cylindrical body whose peripheral surface is formed with several longitudinally extending grooves 8. The axial bore of the plunger 8 is shown at 9. The downstream end portion 9a of the bore 9 is enlarged, and the plunger 4 consists of iron having a chemically applied coat of nickel which protects the main body of ferromagnetic material against corrosion and reduces friction between the plunger and the section 3b. Moreover, and since the magnetic properties of nickel are inferior to those of iron, the coating of the plunger 4 constitutes a barrier between the plunger and the core. This insures abrupt closing of the valve 1 in response to deenergization of the coil 2.

The annular left-hand end face 11 of the plunger 4 is adjacent to the right-hand end face 13 of a smaller-diameter end portion 14 of the section 3a. The smaller-diameter end portion 14 has an axial bore 12 in communication with radially extending bores 16. The annular right-hand end face 17 of the plunger 4 is adjacent to the left-hand end face 18 of a fixed valve seat 19a which constitutes the innermost portion of a brass nipple 19 threadedly connected to and extending into the section 3b of the core. The axial bore 27 of the nipple 19 is the outlet opening of the valve 1. The inlet opening 20 of the valve 1 is an axial bore provided in a brass nipple 21 which extends into and is threadedly connected with the section 3a of the core.

The end face 18 of the seat 19a has an annular fluid evacuating opening consisting of equally spaced ports 22 (see FIG. 2a) which receive streams of compressed gaseous fluid when the plunger 4 is held in the left-hand end position of abutment with the end face 13 of the end portion 14. Alternatively, and as shown in FIG. 2b, the end face 18′ of a modified fixed valve seat can be provided with a fluid evacuating opening 23 in the form of a circumferentially complete channel which conveys compressed gaseous fluid toward the outlet opening 27. The right-hand ends of the ports 22 (as viewed in FIG. 1) communicate with an annular chamber 24 which is machined into the periphery of the valve seat 19a and communicates with the outlet opening 27 by way of several inclined channels 26. The left-hand end portions of the ports 22 are sealed by the annular end face 17 of the plunger 4 when the latter is held in the right-hand end position, i.e., in a position of abutment with the end face 18 of the valve seat 19a. The center of the circle including the annulus of ports 22 is preferably located on the axis of the plunger 4.

The directions in which the compressed gaseous fluid flows from the inlet opening 20 of the nipple 21 toward the outlet opening 27 of the nipple 19 is indicated by arrows. Compressed fluid enters via inlet opening 20, enters the axial bore 12 and radial bores 16 of the smaller-diameter portion 14 of the section 3a, flows in the peripheral grooves 8 of the plunger 4 (the plunger is assumed to be held in the left-hand end position, as viewed in FIG. 1), flows radially inwardly between the end faces 17 and 18, through the ports 22, chamber 24, inclined channels 26 and into the outlet opening 27. At the same time, compressed gas also flows from the inlet opening 20, via axail bore 12 of the portion 14, axial bore 9 of the plunger 4, and into the ports 22 to thereupon flow into the outlet opening 27 via chamber 24 and channels 26.

FIG. 1 further shows a sealing element 28 (e.g., a conventional O-ring) which is interposed between a washer 29 and the adjacent flange of the insulating spool 7. The washer 29 is held in the illustrated position by a nut 30 which meshes with the nipple 19. A second washer 29 is adjacent to the left-hand flange of the spool 7 and is biased against such flange by a collar 21a of the nipple 21. The washers 29 consist of diamagnetic material which is an electrical insulator. The O-ring 28 yieldably opposes axial shifting of the coil 2.

The cooling jacket 6 has heat dissipating ribs or fins 31 and is formed with one or more longitudinally extending peripheral grooves 32 to interrupt eddy currents. Similar grooves, serving the same purpose as the grooves 32 but not shown in FIG. 1, are provided in those portions of the nipples 19 and 21 which respectively extend into the sections 3b and 3a of the ferromagnetic core.

The reference character 33 denotes a portion of means for energizing the coil, namely, a terminal box which is secured to the cooling jacket 6 by a ring 34 and constitutes a connector between the coil 2 and a suitable source of electrical energy. When the circuit of the coil 2 is completed, the energized coil 2 propels the plunger 4 to the left-hand end position of FIG. 1, i.e., the plunger overcomes the pressure of compressed gaseous fluid which acts against its left-hand end face 11. The plunger 4 comes to a halt when the end face 11 reaches the end face 13 of the smaller-diameter portion 14 of the section 3a. The clearance between the right-hand end face 17 of the plunger 4 and the end face 18 of the fixed valve seat 19a is then wide enough to permit compressed gas to flow into the ports 22 and thence into the outlet opening 27 via chamber 24 and channels 26. As mentioned above, the fluid flows along several paths, namely, axially through the plunger 4 (via bore 9) as well as around the plunger (via grooves 8). All paths merge in the clearance between the end faces 17 and 18.

The plunger 4 is preferably inserted into the section 3b with minimal clearance, and the end face 13 of the portion 14 is preferably machined with a high degree of precision (e.g., by grinding and polishing). This insures that the plunger 4 offers negligible resistance to magnetic flux between the sections 3a and 3b of the ferromagnetic core.

When the coil 2 is deenergized, compressed gas in the inlet opening 20 immediately propels the plunger 4 in a direction to the right so that the end face 17 of the plunger abuts against the end face 18 of the valve seat 19a and seals the ports 22 from the bore 9 and grooves 8.

The term "ferromagnetic" is intended to denote iron, cobalt, nickel and certain other alloys which exhibit pronounced ferromagnetic properties. The term "magnetic" is intended to denote materials which exhibit ferromagnetic properties in contrast to materials (such as that of the washers 29) which are to be classified as diamagnetic materials.

An advantage of the valve 1 is that the plunger 4 establishes several paths for the flow of pressurized fluid from the end face 11 to the end face 17. One of these paths is defined by the axial bore 9 and the other paths are defined by the peripheral grooves 8. Thus, when the coil 2 is energized to maintain the plunger 4 in the left-hand end position in which the plunger is held by the portion 14 of the section 3a, pressurized fluid can enter the narrow clearance between the end faces 17 and 18 by flowing axially through the plunger 4 as well as around the plunger, i.e., radially inwardly toward the ports 22 of the fixed valve seat 19a. This renders it possible to allow relatively large quantities of pressurized fluid to flow into the outlet opening 27 even though the width of the clearance between the end faces 17 and 18 is minimal. The effective cross-sectional area of the clearance is substantial in spite of the fact that the distance between the end faces 17, 18 in open position of the plunger 4 is extremely small. Such narrow clearance (in open position of the plunger 4) is highly desirable because the density of the magnetic force lines between the seat 18 and the plunger 4 (and hence the magnetic field strength) does not decrease appreciably when the plunger moves from the closed toward the open position, i.e., the energized coil 2 can propel the plunger to open position with a minimum of delay so that the valve can be caused to permit and to interrupt the flow of fluid from the inlet opening 20 to the outlet opening 27 at a frequency which satisfies the requirements of presently known testing or monitoring equipment for mass-produced or mass-processed commodities (such as cigarettes, filter rod sections, coffee beans and others) and which can also satisfy the requirements of equipment which necessitates opening and closing of valves at a frequency greatly exceeding the presently required frequency. For example, the trend in the manufacture of cigarettes is to increase the output of cigarette makers from the present average output of approximately 4,000 cigarettes per minute to an output of 6,000 per minute or more. Presently known valves which are used to segregate defective cigarettes from a cigarette stream whose constituents advance at a speed corresponding to an output of up to and in excess of 100 per second are incapable of closing and opening at a frequency which would insure that the jets of compressed gas issuing from such valves would invariably expel defective cigarettes but would not affect the position of immediately preceding or immediately following acceptable articles. A testing apparatus for cigarettes wherein the improved valve can be utilized to admit compressed air to the ejector nozzle for defective or potentially defective cigarettes is disclosed, for example, in commonly owned U.S. Pat. No. 4,004,593 granted Jan. 25, 1977 to Kaeding et al.

The configuration of grooves 8 can be varied within a wide range without departing from the spirit of the invention. For example, channel-like grooves can be replaced by grooves which are obtained by facetting the peripheral surface of the plunger 4 so that each groove is bounded by a flat surface (one facet of the plunger) and a concave surface (a portion of the internal surface of the section 3b). Such facetting of the plunger is often desirable because it results in pronounced reduction of that portion of the peripheral surface of the plunger which is in frictional engagement with the internal surface of the ferromagnetic core.

The provision of a composite opening in the form of an annulus of equally spaced ports 22 in the end face 18 of the seat 19a is desirable and advantageous because such distribution of ports insures uniform evacuation of compressed fluid which enters the clearance between the end faces 17, 18 in open position of the plunger 4. The same applies for the circumferentially complete channel or opening 23 which is shown in FIG. 2b. The center of the circle formed by the ports 22 of FIG. 2a or by the circumferentially complete opening 23 of FIG. 2b is preferably located on the common axis of the plunger 4, sections 3a, 3b of the core and valve seat 19a. As mentioned above, that portion of the end face 17 which is in register with the ports 22 or opening 23 is uninterrupted to insure that the bore 9 and grooves 8 are fluid tightly sealed from the chamber 24, channels 26 and outlet opening 27 when the coil 2 is deenergized, i.e., when the pressurized fluid acting against the end face 11 of the plunger 4 maintains the other end face 17 of the plunger in contact with the end face 18 of the fixed valve seat 19a.

FIG. 3 shows a second solenoid operated shutoff valve 101 wherein all such parts which are identical with or clearly analogous to corresponding parts of the valve 1 are designated by similar reference characters plus 100. The coil 102 is an elongated cylinder which surrounds an insulating spool 107. The latter, in turn, surrounds a composite core including two coaxial ferromagnetic tubular sections 103a, 103b. The reciprocable valving element or plunger 104 is received in the section 103b and is movable between the end face 118 of the fixed valve seat 119a of the nipple 119 and the end face 113 of the smaller-diameter inner end portion 114 of the section 103a. The latter is threadedly connected with the nipple 121 which defines the inlet opening 120. The jacket 106 has fins or ribs 131 and one or more peripheral grooves 132.

The plunger 104 is a solid cylinder having a peripheral surface provided with several helical grooves 108 which make an acute angle alpha with the axis 140 of the plunger. The composition and coating of the plunger 104 are the same as the composition and coating of the plunger 4.

When the circuit of the coil 102 is completed via terminal box 133, the energized coil 102 moves the plunger 104 to the left-hand end position, i.e., into abutment with the end face 113 of the portion 114. The axial outlet opening 127 extends all the way to the end face 118 of the valve seat 119a and receives streams of compressed gas from the discharge ends of the helical grooves 108 in the periphery of the plunger 104. The right-hand end portion of the plunger 104 constitutes a short frustrum of a cone and the discharge ends of the grooves 108 are machined into the conical peripheral surface of such frustum. The grooves 108 define several discrete paths for the flow of gas from the axial bore 112 and radial bores 116 into the receiving or intake ends of the grooves 108. Such intake ends are machined into the conical peripheral surface of the short frustum of a cone which constitutes the left-hand end portion of the plunger 104. The diameter of the bore 112 is a small fraction of the diameter of the inlet opening 120 and radial bores 116, i.e., the major part of inflowing gas flows radially via bores 116 and thereupon enters the helical grooves 108 at the left-hand end face of the plunger 104.

When the coil 102 is deenergized, the compressed gas immediately propels the plunger 104 against the end face 118 of the valve seat 119a whereby the uninterrupted central portion of the end face 117 seals the left-hand end of the outlet opening 127. The bore 112 then acts not unlike a flow restrictor or a jet orifice.

The plunger 104 of the valve 101 does not have an axial bore corresponding to the bore 9 of the plunger 4 because the central portion of its end face must seal the axial outlet opening 127 at the end face 118 when the coil 102 is deenergized. The valve 101 also exhibits a number of important advantages including those outlined in connection with the valve 1 plus several others. For example, when a valve which serves to control the flow of a compressed gas (e.g., air) to one or more nozzles which discharge jets of compressed gas against selected commodities moving at a high speed past the nozzle is used for a relatively long period of time, its ability to open and close at required intervals decreases and the valving element is incapable of moving to one and the same open and/or closed position. This entails several drawbacks including losses in compressed air due to leakage when the valving element should dwell in the open or closed position, eventual ejection or segregation of satisfactory articles, or the inability of jets to expel defective articles within the alloted intervals of time.

It has been found that such reduction of the frequency of valve opening and closing, as well as the inability of the valving element to completely seal the path or paths for the flow of fluid from the inlet opening to the outlet opening is attributable to deposition of foreign matter in the path or paths wherein the fluid flows toward the outlet opening. Thus, compressed air often or invariably contains some water and/or oil, even if such gas is caused to pass through one or more water and/or oil filters prior to admission into the inlet opening of the valve. The percentage of oil and/or water is minute; nevertheless, such contaminants are likely to deposit in the narrow paths for the flow of fluid toward the valve seat and/or in the opening or openings of the seat and to affect the reproducibility of operation of the valve.

The deposition of water, oil and/or other contaminants which can be found in compressed gas is highly unlikely or plain impossible when the passages for the flow of fluid from the one to the other end face of the valving element are configured in a manner as described in connection with FIG. 3. Thus, the helical grooves 108 are much less likely to accumulate water and/or oil than straight channels. This will be readily appreciated by bearing in mind that the friction between the plunger 104 and the section 103b of the core is extremely low so that, when the coil 102 is energized to move the end face 117 of the plunger away from the end face 118 of the fixed valve seat 119a, the streams of fluid in the helical grooves 108 cause the plunger to rotate about its axis. Such rotation results in expulsion of contaminants (if any) from the grooves 108. Moreover, the contaminants which are expelled from the grooves 108 cannot accumulate and eventually incrustate on the internal surface of the section 103b because the plunger 104 begins to rotate in response to each opening of the valve 101, i.e., in response to each energization of the coil 102. Rotation of the plunger 104 entails another important advantage, namely, that the wear upon the peripheral surface of the plunger and upon the internal surface of the section 103b is uniform. A single helical or substantially helical groove will suffice to compel the plunger to rotate about its axis when the coil is energized. The plunger 4 or 104 may be provided with one or more straight (longitudinally extending) and one or more helical or otherwise configured peripheral grooves which make an angle greater than zero degrees with the axis of the plunger. Such simple expedient of rotating the plunger by the conveyed fluid insures automatic cleaning of the paths for the flow of pressurized fluid as well as uniform wear upon the surfaces which more relative to each other. This, in turn, insures that the frequency at which the valve opens and closes does not decrease in response to prolonged use and that the valving element invariably assumes identical open and closed positions, even if the valve is used in aforedescribed testing equipment wherein it is likely to be actuated at an extremely high frequency and is permitted to remain open for intervals of the time amounting to a few thousandths of a second.

FIG. 4 shows a plunger 204 which can be used as a substitute for the plunger 4 of FIG. 1. The plunger 204 has an axial bore 9 and several helical peripheral grooves 108. Thus, the plunger 204 rotates when moved to the open position in response to energization of the coil 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. An electromagnetic shutoff valve for fluids, particularly for compressed gaseous fluids, comprising a tubular coil; a tubular ferromagnetic core surrounded by said coil; a fixed valve seat in said core, said seat having an end face and an annular opening provided in said end face for evacuation of fluid in open position of the valve; a ferromagnetic plunger reciprocably mounted in said core and having a first end face movable into and from sealing engagement with the end face of said seat and a second end face which is subjected to the pressure of inflowing fluid so that the fluid tends to maintain said first end face in engagement with the end face of said seat, said plunger further having a plurality of passages defining discrete paths for the flow of fluid from said second to said first end face, said passages including a first passage having a discharge end within said annular opening and a second passage having a discharge end located radially outwardly of said annular opening; and means for energizing said coil to thereby move said plunger away from said seat and permit the fluid to flow from said passages into said opening, the end face of said seat being engaged by the first end face of said plunger in deenergized condition of said coil whereby the first end face of said plunger seals said opening from said passages.

2. A valve as defined in claim 1, wherein said plunger has a peripheral surface and said second passage includes at least one groove in said peripheral surface.

3. A valve as defined in claim 1, wherein said plunger has an axial bore which constitutes said first passage.

4. A valve as defined in claim 1, wherein said opening consists of a plurality of discrete ports.

5. A valve as defined in claim 1, wherein said annular opening is a circumferentially complete channel in said end face of said seat.

6. A valve as defined in claim 1, wherein said valve seat has an annular chamber communicating with said opening and a plurality of fluid evacuating channels communicating with said chamber.

7. A valve as defined in claim 6, wherein said seat forms part of a nipple having an axial outlet opening communicating with said channels.

8. A valve as defined in claim 1, wherein said core includes two coaxial tubular sections one of which has an inlet opening for admission of fluid to said second end face of said plunger and the other of which receives said plunger and said seat.

9. A valve as defined in claim 1, wherein said plunger has nickel-coated surfaces.

10. A valve as defined in claim 1, further comprising a cooling jacket surrounding said coil.

11. A valve as defined in claim 10, wherein said jacket includes means for interrupting eddy currents which develop on energization of said coil.

* * * * *